J. T. BANNISTER.
COMBINATION HAND PLOW AND WHEELBARROW.
APPLICATION FILED JUNE 3, 1919.
1,319,686.
Patented Oct. 28, 1919.
2 SHEETS—SHEET 1.
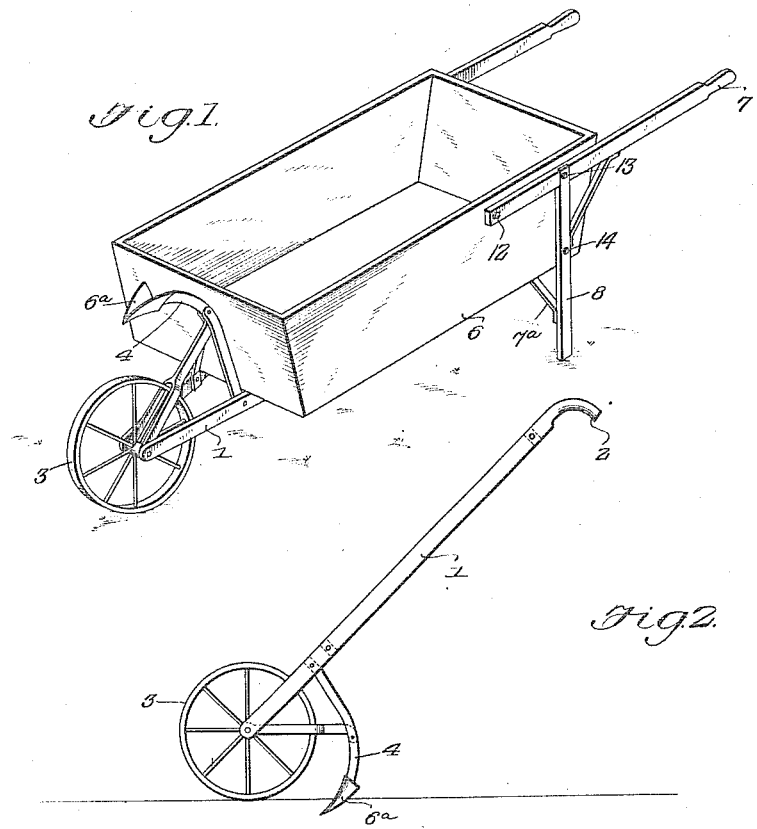
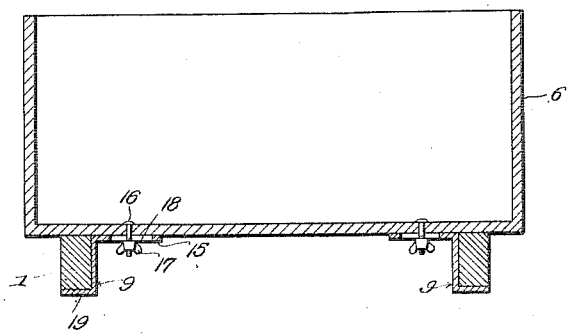
Witnesses
Inventor
J. T. Bannister,
By Victor J. Evans
Attorney J. T. BANNISTER.
COMBINATION HAND PLOW AND WHEELBARROW.
APPLICATION FILED JUNE 3, 1919.

1,319,686.

Patented Oct. 28, 1919.
2 SHEETS—SHEET 2.

Witnesses

Inventor
J. T. Bannister,
By Victor J. Evans
Attorney

UNITED STATES PATENT OFFICE.

JAMES T. BANNISTER, OF PORTSMOUTH, VIRGINIA.

COMBINATION HAND-PLOW AND WHEELBARROW.

1,319,686.  Specification of Letters Patent.  Patented Oct. 28, 1919.

Application filed June 3, 1919. Serial No. 301,384.

*To all whom it may concern:*

Be it known that I, JAMES T. BANNISTER, a citizen of the United States, residing at Portsmouth, in the county of Norfolk and State of Virginia, have invented new and useful Improvements in Combination Hand-Plows and Wheelbarrows, of which the following is a specification.

One of the objects of my invention is the provision of a combination hand plow and wheel-barrow—*i. e.*, a device adapted to be used in one position in the same manner as the ordinary hand plow for garden purposes and in inverted position as a wheelbarrow; the single ground wheel serving for both uses of the device.

Another object of the invention is the provision of a device capable of ready application to a hand plow without the use of tools or the employment of skilled labor, and adapted when so applied to convert the hand plow into a wheel-barrow capable of being handled with the same facility as an ordinary wheel-barrow and possessed of the same capacity as an ordinary wheel-barrow.

Manifestly by the practice of my invention a gardener is provided with a hand plow and with a wheel-barrow at a cost little above that of a hand plow alone. This is due to the fact that my novel device is simple and inexpensive in construction, its major portion being preferably of wood.

With the foregoing in mind the invention in all of its details will be fully understood from the following description and claims when the same are read in connection with the drawings, accompanying and forming part of this specification, in which:

Figure 1 is a perspective showing my improvement as properly applied to a hand plow, which latter is preferably of the ordinary well known construction.

Fig. 2 is a side elevation of the plow.

Fig. 4 is an enlarged transverse section taken through my novel device and showing one pair of clips for fixing the same in superimposed position upon the frame bars of the hand plow.

Similar numerals of reference designate corresponding parts in all of the views of the drawings.

Figure 3:
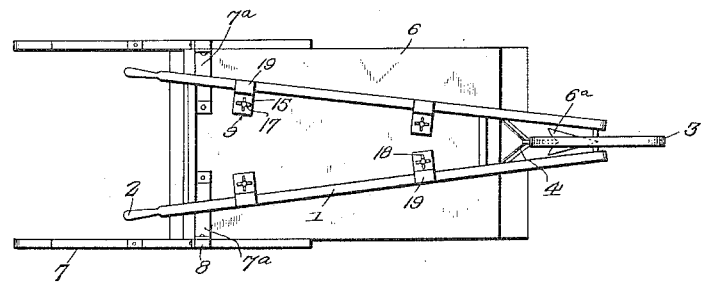
Fig. 3 is an inverted plan view showing the attachment of my novel device to the frame bars of the hand plow.
Figure 5:
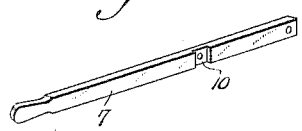
Fig. 5 is a detail view showing one of the handle members of my novel device.
Figure 6:
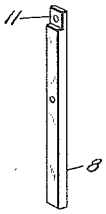
Fig. 6 is a detail view of one of the leg members thereof.
Figure 7:
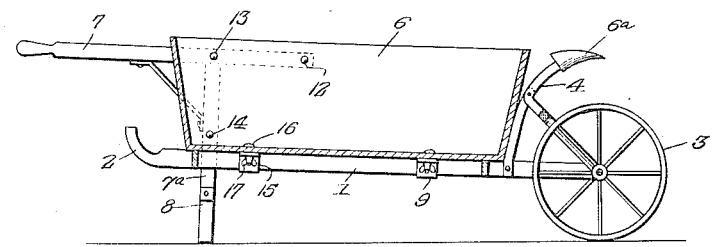
Fig. 7 is a longitudinal vertical section.

The hand plow illustrated is preferably of the ordinary well known construction, and comprises forwardly converged frame bars 1 the rear ends of which are shaped to form handles 2, a ground-wheel 3 mounted between the forward spaced ends of the frame bars 1, and a shank 4 fixed with respect to the frame bars 1 and adapted for the detachable connection of ground-working tools of various description; the said shank 4 being shown as equipped with a cultivator blade 6ª.

My invention contemplates inverting the hand plow and utilizing the same as the carriage of a wheel-barrow. To this end I provide a body or receptacle 6, preferably of wood, and adapted to be superimposed on the frame bars 1 against and immediately in rear of the shank 4 which then extends upwardly from the frame bars. I also provide the body 6 with handle members 7 and leg members 8, and with two pairs of clips 9. The handle members 7 are preferably of wood and are recessed in their outer sides at intermediate points in their length, as indicated by 10. The leg members 8 are also preferably of wood and have their upper ends rabbeted, as indicated by 11 to coöperate with the said recessed portions of the members 7. The members 7 are bolted to the side walls of the body 6 at 12, and the members 8 and 7 are bolted together and to the side walls of the body 6 at 13, while the leg members 8 alone are bolted to the body 6 at 14. In this way the handle members 7 and the leg members 8 are strongly connected and fixed with respect to each other and to the body 6; and it will also be apparent that the connections of the leg members 8 and the body 6 are braced and strengthened by the described arrangement of the leg members 8 with respect to the handle members 7, as well as by the transverse braces 7ª, Figs. 1 and 3.

Each of the clips 9 of the two pairs employed is made up of an angular member 15, a threaded and headed bolt 16 and a wing-nut 17. The angular member 15 has an intermediate portion and an apertured arm 18 that is opposed to the under side of the body 6. It also has an outwardly directed arm 19 adapted to be disposed at the under side of one of the inverted frame members 1 of the hand plow. The head of each bolt 16 is arranged against the upper side of the bottom wall of the body 6, and the shank of said bolt is passed downwardly through said bottom wall and through the aperture in the inwardly directed clip arm 18, and is provided below said clip arm with one wing-nut 17.

By particular reference to Fig. 3, it will be noted that the clips 9 of the forward pair are arranged closer together than the clip 9 of the rear pair, in order to compensate for the rear divergence of the frame bars 1. Consequently when the body 6 is superimposed upon the frame bars 1 of the inverted hand plow, and the angular members 15 of the clips 9 are positioned with their outwardly directed arms 19 under the bars 1, and the wing-nuts 17 are tightened upon the bolts 16, the body 6 will be securely fixed with respect to the frame bars 1 and in such manner that there is no liability of casual disconnection or displacement. When, however, it is desired to move the body 6 from the frame bars 1, as when the hand plow is to be used alone in the ordinary manner, the same may be readily accomplished after the wing-nuts 17 are loosened and the angular members 15 are manipulated to disengage the same from the frame bars 1.

In the practical use of my improvement as a wheel-barrow, it will be manifest that the operator grasps the handle members 7 and manipulates the device in the same manner as an ordinary wheel-barrow.

The specific construction herein illustrated and described constitutes the best practical embodiment of my invention of which I am cognizant. I do not desire, however, to be understood as confining myself to the specific construction and relative arrangement of parts as set forth, since in the future practice of the invention various changes in the form and arrangement of parts may be made within the scope of my appended claims. For instance when deemed expedient the handles may be braced as shown by diagonal metallic straps.

Having described my invention, what I claim and desire to secure by Letters-Patent, is:

1. An attachment for hand plows comprising a box-like body, handle members and leg members fixed with respect thereto, and means at the under side of the body whereby the same may be fixedly connected with the frame bars of a hand plow when it is superimposed upon said frame bars.

2. An attachment for hand plows comprising a box-like body, handle members at opposite sides thereof and extending rearwardly therefrom and having recesses in their outer sides at intermediate points in their length, leg members arranged at opposite sides of the body and having rabbeted upper ends interlocked with the recessed portions of the handle members, bolts connecting the handle members to the body, bolts connecting the leg members to the body, bolts extending through and connecting the leg members and handle members together and to the body, and adjustable clips at the under side of the body for detachably connecting the same with the frame bars of a hand plow when the body is superimposed upon said frame bars.

3. The combination of a hand plow, and a box-like body superimposed upon the frame bars of the hand plow in inverted position of the latter and detachably connected with said frame bars and having legs and a handle.

4. The combination of a hand plow, and a box-like body superimposed upon the frame bars of the hand plow in inverted position of the latter and arranged against and immediately in the rear of the shank of the hand plow and detachably connected with the frame bars and having legs and a handle.

5. The combination of a hand plow, and a box-like body superimposed upon the frame bars of the hand plow in inverted position of the latter and arranged against and immediately in rear of the shank of the hand plow and detachably connected with the frame bars and having legs and a handle and also having braces.

In testimony whereof I affix my signature.

JAMES T. BANNISTER.